United States Patent [19]
Renz

[11] Patent Number: 4,505,772
[45] Date of Patent: Mar. 19, 1985

[54] APPARATUS FOR LAMINATING SHEETS WITH A PLASTIC FILM
[76] Inventor: Peter Renz, Unterm Stein 9, 7072 Heubach-Lautern, Fed. Rep. of Germany
[21] Appl. No.: 491,230
[22] Filed: May 3, 1983
[30] Foreign Application Priority Data
 May 6, 1982 [DE] Fed. Rep. of Germany ....... 3216970
[51] Int. Cl.³ .................. B26D 5/00; B32B 31/00; B32B 31/04; B65H 7/08
[52] U.S. Cl. ..................... 156/355; 156/364; 156/383; 156/366; 156/510; 156/523; 156/552; 271/110; 271/111
[58] Field of Search .............. 156/351, 353–355, 156/364, 383, 552, 306, 494, 510, 523, 538, 582; 83/209, 285, 286, 289, 298, 321, 329, 331; 271/110, 111

[56] References Cited
U.S. PATENT DOCUMENTS

| 3,131,739 | 5/1964 | Harrington | 83/209 |
| 3,400,031 | 9/1968 | Crathern | 156/366 X |
| 3,522,129 | 7/1970 | Crathern | 156/366 X |
| 4,009,957 | 3/1977 | Suzuki et al. | 156/366 X |
| 4,030,722 | 6/1977 | Irvine et al. | 271/111 X |
| 4,171,130 | 10/1979 | Jeschke et al. | 271/111 X |
| 4,214,936 | 7/1980 | Del Bianco | 156/366 X |
| 4,386,769 | 6/1983 | Ito et al. | 271/111 X |
| 4,397,709 | 8/1983 | Schwenzer | 156/351 |

Primary Examiner—Edward Kimlin
Assistant Examiner—Merrell C. Cashion, Jr.
Attorney, Agent, or Firm—Cushman, Darby & Cushman

[57] ABSTRACT

In an apparatus for laminating sheets of paper, card or board with plastic film which, for example, is clear and transparent, an intermittently running sheet feeder (2) is disposed upstream of a continuously running laminating device (4) and an intermittently running cross cutter (43) is disposed downstream of the laminating device. The sheet feeder (2) and cross cutter (43) have conveying drives, which can be switched on and off, and photoelectric barriers (27, 28, 50) which traverse the conveying track and, via timing elements and control devices, control the conveying drives in the sheet feeder and in the cross cutter in accordance with the mode of operation of the laminating device.

7 Claims, 4 Drawing Figures

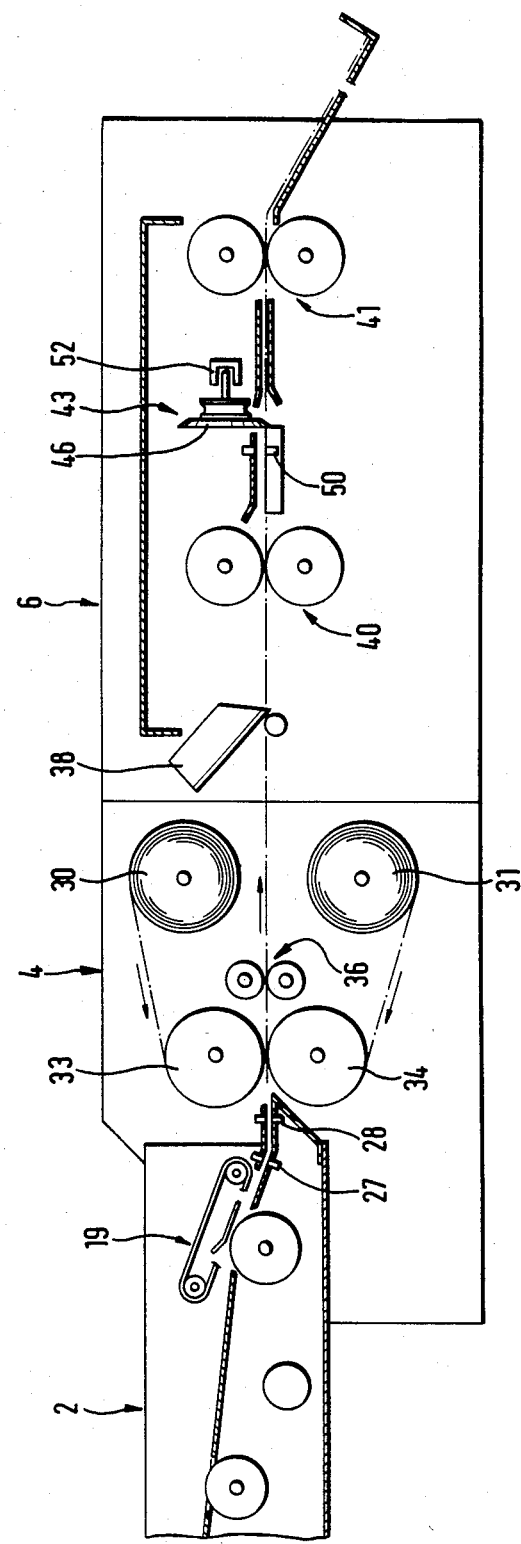

APPARATUS FOR LAMINATING SHEETS WITH A PLASTIC FILM

BACKGROUND OF THE INVENTION

The invention relates to an apparatus for laminating sheets of paper, card or board with plastic film.

Laminating devices which perform this task are known. For laminating the sheets, clear transparent films are in general used which are either self-adhesive or thermoplastic and are applied with the action of heat. For application, a pair of rollers is used which draws films off from stock rolls and, for laminating, applies them to the sheets which are passed through between the pair of rollers.

The sheets must be fed individually to such continuously working laminating devices; hitherto, this was done by manual feeding.

After laminating, a continuous film band, in which the sheets are enclosed at mutual distances, leaves the laminating device. It is then necessary to cut out the sheets, in particular along the sheet edges or at some distance from the sheet edges. There are no problems in arranging continuously working longitudinal cutters downstream of the continuously working laminating device. Problems arise, however, in cross-cutting, that is to say cutting transversely to the conveying direction, since this can be carried out only while the film band is at a standstill.

Devices have been disclosed which separate sheets from a stack and feed individual sheets to, for example, printing presses. On the other hand, devices have been disclosed which cut a fed film band transversely to the conveying direction; however, because of the different working cycles, these two processes are not carried out in connection with a laminating device.

SUMMARY OF THE INVENTION

It is the object of the present invention to provide an apparatus in which a sheet feeder is disposed upstream of a laminating device and a cross cutter is disposed downstream of the laminating device and in which the working cycles of the sheet feeder and of the cross cutter are controlled automatically in such a way that they are synchronized with the continuous feed of the laminating device.

To achieve the object, control devices are provided in the sheet feeder and in the cross cutter, which control devices are in turn controlled by the leading and trailing edges of the sheets, by means of photoelectric barriers along the conveying track, and switch the conveying drives of the sheet feeder and of the cross cutter on and off, directly or via timing elements.

In such an arrangement, the following functions must be ensured:

The conveying distance from the sheet feeder to the laminating device is controlled so that each sheet is conveyed only for such a distance that its leading edge can just be gripped by the rollers of the laminating device. At the conveying speed of the sheet feeder, which speed is higher than that of the laminating device, further conveying would be harmful since the sheets would be pushed together and crumpled.

The sheets are to be introduced into the laminating films at fixed mutual distances. The control device in the sheet feeder should be equipped for setting these distances to any desired value and for maintaining the latter.

In the cross cutter, it must be ensured, that the cross cuts are carried out either as accurately as possible on the edges of the laminated sheets or at a given distance from these edges. This point must be ensured both at the leading edges and the trailing edges of the sheets.

The invention provides a device which runs fully automatically and in which individual sheets are taken from a stack, laminated, cut out transversely from the laminating film and ejected.

In addition, a device for trimming the sheet edges running in the conveying direction can be provided. This works continuously and can be arranged downstream of the laminating device without any problems.

Further details of the invention are as follows. The sheets can be separated and brought one after the other into a waiting position.

Whenever a sheet has been drawn off the laminating device, a further sheet can be brought into the waiting position, but only after a defined period. This prevents the sheets being pushed together or overlapping.

Defined spaces can be maintained between the sheets which are to be introduced into the laminating films.

It is possible to ensure that the conveying drive in the cross cutter is stopped, whenever the laminating film web containing the sheets has reached a cross-cutting position.

Different overrun times of the conveying drive can be set for the leading and trailing edges of each sheet.

A conveying drive can be provided which can be stopped rapidly.

The cross cutter can be equipped with a circular blade, further photoelectric barriers in conjunction with the circular blade influencing the control of the cross cutter.

BRIEF DESCRIPTION OF THE DRAWINGS

The invention, together with further features, is explained in more detail by reference to drawings and functional charts, in which:

FIG. 2 shows a diagrammatic cross-section through the complete apparatus,

Page 12 shows a functional chart of the sheet feeder, and

Page 13 shows a functional chart of the cross cutter.

DETAILED DESCRIPTION

Figure 1:
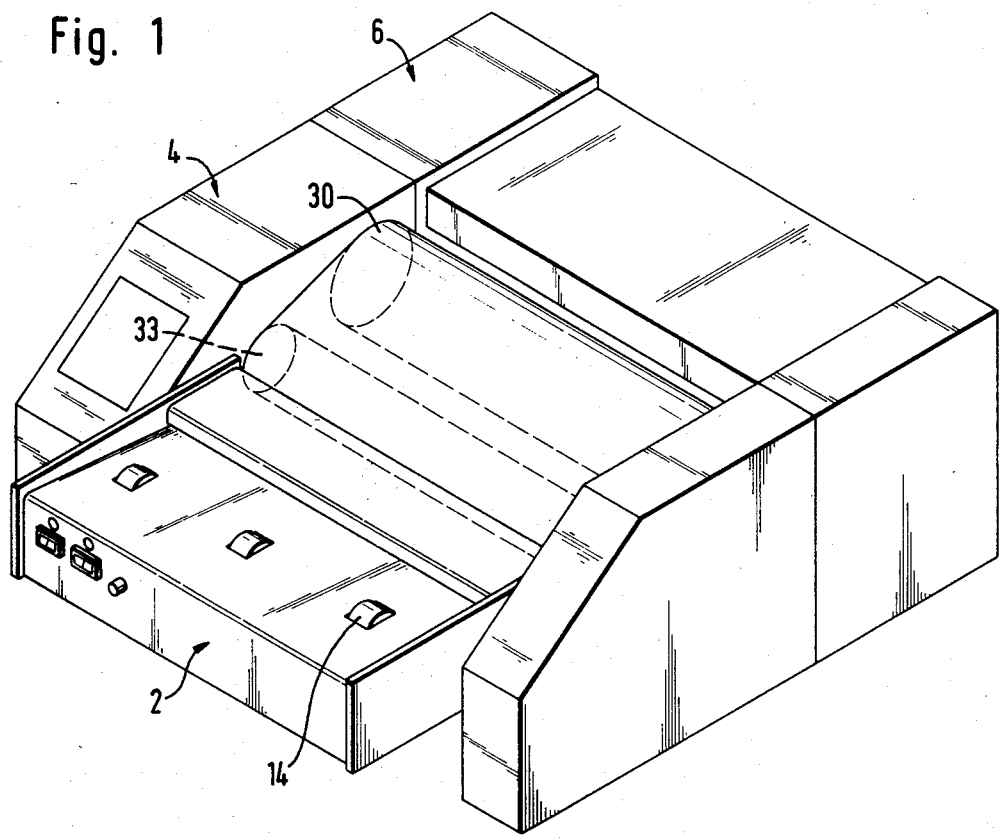
FIG. 1 shows a perspective view of the complete apparatus.

In FIGS. 1 and 2, the sheet feeder is marked 2, the laminating device is marked 4 and the device for longitudinal and transverse cutting is marked 6. In operation, the three individual devices are rigidly connected to one another.

Figure 3:
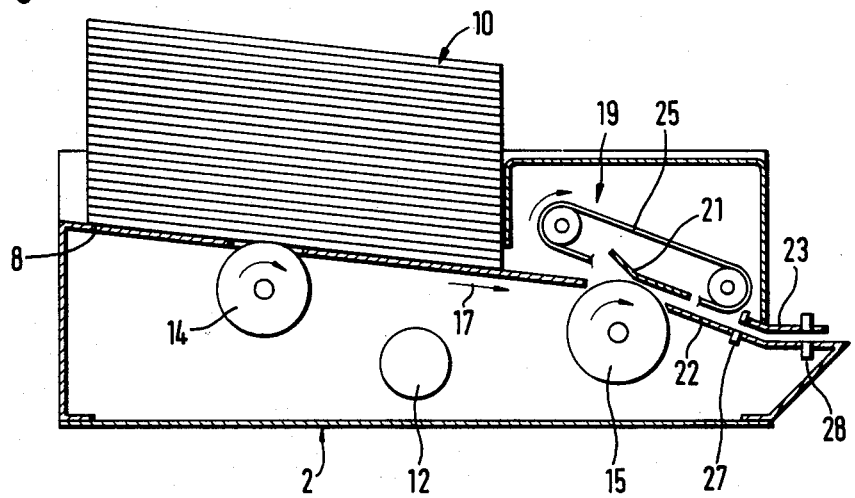
FIG. 3 shows a diagrammatic cross-section through the sheet feeder.

FIG. 3 shows the sheet feeder 2 in detail. It has a slide table 8 which carries a stack 10 of the sheets which are to be laminated. A direct current motor 12 drives feed rollers 14 and 15 by means which are not shown. The position of the feed rollers 14 is also shown in FIG. 1. The arrows drawn in designate the direction of rotation of the feed rollers, and arrow 17 designates the conveying direction.

At the end of the slide table 8, a transfer chamber marked 19 as a whole is provided. It serves to separate the sheets taken from the stack 10. It has guide plates 21, 22, 23 and a belt drive 25. The latter is provided with belts of a material which adheres well to the sheets. The belt drive 25 is driven in the direction opposite to that of the feed rollers 15. It ensures that, above a sheet which is to be conveyed, all further sheets are pushed back.

Approximately in the middle of the web width, a first photoelectric barrier 27 and, downstream thereof, a second photoelectric barrier 28 are arranged at the end of the transfer chamber. Light beams of the photoelectric burners pass across the conveying track and are broken by the sheets being conveyed.

The laminating device (FIGS. 1 and 2) has two stock rolls 30 and 31 for a self-adhesive laminating film. Laminating rollers 33, 34, which are arranged one above the other and pressed together, each draw a film web from the two stock rolls 30, 31 and press these from either side against sheets which are fed to the laminating rollers by the sheet feeder 2. The film web with enclosed sheets then runs through a pair of rollers 36 and is then fed to the device 6 for longitudinal and transverse cutting.

Figure 4:
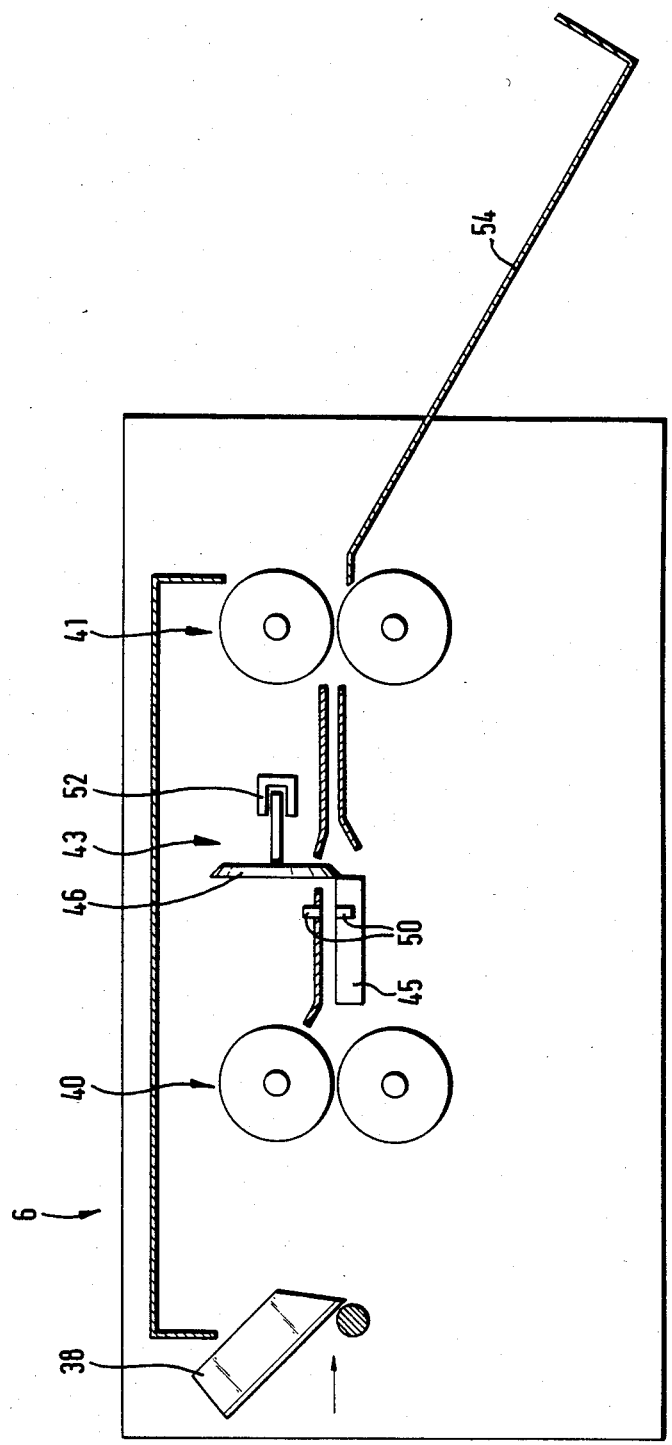
FIG. 4 shows a diagrammatic cross-section through a device for longitudinal and transverse cutting.

This device (see FIG. 4) has a longitudinal cutter 38 of known construction, which trims the edges running in the conveying direction. This is followed by a front pair of conveying rollers 40 and a rear pair of conveying rollers 41. The two pairs of rollers are driven via an electromagnetic clutch by a direct current motor (split-pole motor) which is not shown, and can be stopped by an electromagnetic brake. The front pair of conveying rollers 40 has a peripheral speed which is about 5% higher than that of the laminating rollers 33, 34. The reason for this is that, during the cutting step, the film web sags a little as a reserve loop. It is then transported away at a higher speed. The rear pair of conveying rollers has a peripheral speed which is about 3% higher than that of the front pair, so that the film web is kept under tension until it is cut.

The cross cutter 43 is located between the two pairs of rollers. It has a cutting device extending across the web. This cutting device can be designed in the manner of scissors. Preferably, however, it has a cutter bar 45 and a circular blade 46 which is to move along the former. The circular blade is driven by a commutatable direct current motor via a chain pull. In addition, a drive for the rotary motion of the circular blade is provided.

A third photoelectric barrier 50 arranged within the web controls the conveying drive of the cross cutter.

On either side, outside the edges of the film web, two forked photoelectric barriers 52 are provided. They function as limit switches for the circular blade 46, respond to a component taken along by the latter, for example its axis or its shaft, and serve to switch off the running of the blade and to commutate the direction of rotation of the cross-conveying drive of the blade for the next run of the blade. The rear pair of conveying rollers is followed by a delivery 54 for the sheets which have been cut out.

Details of the control devices of the sheet feeder and the cross cutter are best described by reference to their function. Functional charts are to be found on pages 12 and 13. It is assumed here that the apparatus is already in operation.

The trailing edge of a sheet just drawn in (sheet #1) by the laminating rollers 33, 34 first clears the first photoelectric barrier 27. As a result, a first timing element is switched on. After expiry of its delay time (first timing element times out), the drive of the sheet feeder is switched on. As a result of this, a separated sheet (sheet #2) is advanced, until its leading edge breaks the first photoelectric barrier 27. This switches off the drive motor 12, so that sheet #2 comes to a stop with its leading edge just behind the photoelectric barrier 27, that is to say it assumes a waiting position at that point. The delay by the first timing element is intended to prevent the leading edge of sheet #2, advanced into the waiting position, from pushing against the trailing edge of the preceding sheet (sheet #1) or overlapping the latter.

Finally, the trailing edge of the sheet (sheet #1) drawn in by the laminating rollers 33, 34 clears the second photoelectric barrier 28. As a result, a second timing element is switched on, the delay time of which is adjusted to the desired spacing between two successive sheets. After the delay time has expired, the drive is switched on. The drive conveys the sheet (sheet #2) located in the waiting position towards the laminating device. This sheet (sheet #2) breaks the second photoelectric barrier, and the latter switches the first timing element on. The delay time of the first timing element corresponds to the conveying travel from the sheet feeder to the laminating rollers 33, 34. After this time has expired (timing element times out), the drive is switched off. This sheet (sheet #2) is then gripped by the laminating rollers and conveyed onwards.

The first timing element fulfils two different tasks. Its delay time is set such that the drive is switched off after a certain length of advance towards the laminating rollers has been reached. In addition, it prevents the leading edge of the next sheet advanced into the waiting position from pushing against the trailing edge of a sheet just drawn in by the laminating rollers. The delay time required for this is not critical, that is to say it can be the same as the delay time corresponding to the length of advance, so that a single timing element suffices for the two tasks.

In conjunction with the two photoelectric barriers and the control device, the spaces between the sheets ensure an automatic control of the sheet feeder, so that external starting or stopping signals are not necessary.

When the sheet feeder starts to run, no sheet has yet been drawn into the laminating device. Consequently, both the first and the second photoelectric barriers are clear. Therefore, the first sheet fed in does not come to rest in the waiting position, since in fact the second photoelectric barrier is clear, and instead it continues to run towards the laminating device. However, the second photoelectric barrier, after it has been broken, switches on the first timing element which stops the drive after the desired length of advance towards the laminating rollers has been reached.

The functional chart of the cross cutter is to be found on page 13. The third photoelectric barrier 50 is either broken by the leading edge of a sheet or cleared by its trailing edge. If it is broken, a timing element 3v is switched on and, if it is cleared, a timing element 3h is switched on. These two timing elements are in general set to different times, corresponding to the travel covered by the film web from the photoelectric barrier to the cutting position. After the delay time has expired, the timing element 3h or 3v, which has previously been switched on, disengages a clutch provided in the drive train of the web and switches on an electromagnetic brake for rapid stopping. In addition, a cutter drive is switched on, which ensures that the circular blade 46 is moved along the cutter bar 45 transversely across the film web, which is now at rest, and severs the film. At the end of the blade movement, one of two forked photoelectric barriers 52 is broken. As a result, the cutter drive is switched off and the associated drive motor is commutated, but not yet switched on, for the next cutter movement which must be in the opposite direction. In addition, the electromagnetic brake of the conveying drive of the film web is switched off and the clutch of this conveying drive is engaged, so that the film web is moved further forward. As soon as the next sheet edge reaches the third photoelectric barrier 50, this sequence is repeated.

The electronic circuits were not indicated in detail, since the electronics to be used here are known per se and the essential points in this case are, inter alia, certain functional sequences which can be effected by means of very diverse electronic components.

FUNCTIONAL CHART OF THE SHEET FEEDER

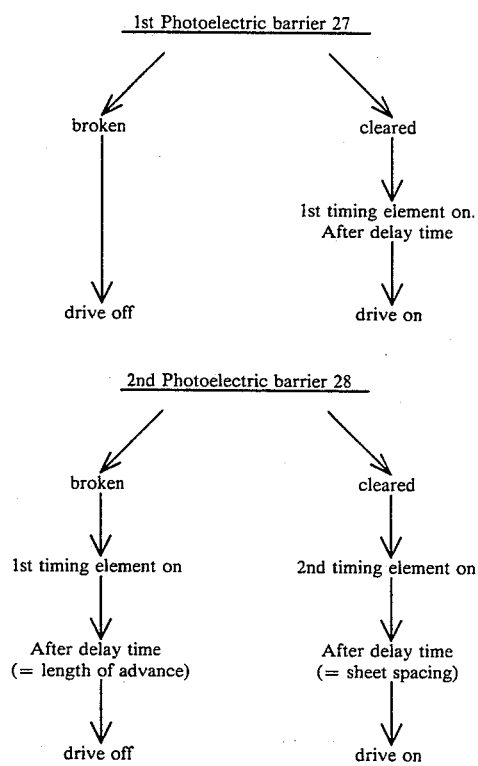

FUNCTIONAL CHART OF THE CROSS CUTTER

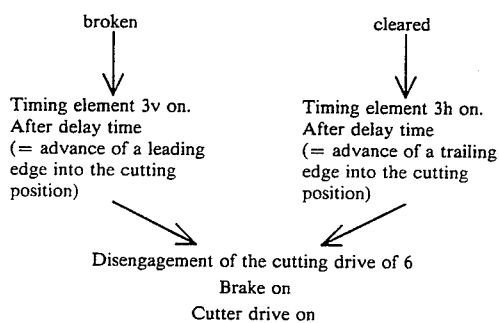

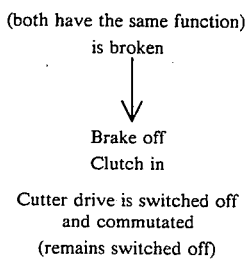

Cutter drive is switched off
and commutated
(remains switched off)

I claim:
1. An apparatus for laminating sheets, comprising:
an intermittently running sheet feeder for feeding sheets to be laminated, said sheet feeder including:
a sheet storage area;
means for defining a feeder conveying path for conveying sheets from said storage area, said conveying path including a waiting position,
a first photoelectric barrier positioned at a first point along said conveying path, and
a second photoelectric barrier positioned at a second point further along said conveying path than said first point, and
a sheet feeder conveyor for conveying sheets from said sheet storage area along said feeder conveying path;
a continuous running laminator for laminating sheets fed thereto by said sheet feeder to form a continuous lamination of said sheets;
an intermittently running cross cutter for cutting said continuous lamination into separate laminated sheets, said cross cutter including:
means for conveying the continuous lamination and separate laminated sheets along a cutter conveying path,
a cutter blade positioned at a predetermined point along said cutter conveying path,
a control device for operating said cutting blade, and
a first timer having a first time delay, coupled to said first and second photoelectric barriers, arranged such that when a trailing edge of a first sheet from said sheet storage area clears said first photoelectric barrier, it begins to time and when it times out, it causes said sheet feeder conveyor to run, thereby advancing a second sheet from said storage area, a leading edge of said second sheet breaking said first photoelectric barrier causing said sheet feeder con- veyor to stop conveying thereby bringing said second sheet to rest at said waiting position, and a second timer having a second time delay, coupled to said second photoelectric barrier, arranged such that when the trailing edge of said first sheet clears said second barrier, it begins to time and when it times out it causes said sheet feeder conveyor to run, thereby advancing said second sheet from said waiting position to said laminator, the first timer being further arranged such that when a leading edge of the second sheet breaks the second barrier, said first timer begins to time and when it times out, said sheet feeder conveyor is caused to stop conveying at which time said second sheet is at said laminator.

2. An apparatus according to claim 1 wherein said cutter comprises:

a third photoelectric barrier positioned at a predetermined point along said cutter conveyor path with respect to said cutting blade, said third barrier being broken by a sheet leading edge or cleared by a sheet trailing edge; and a third timer, coupled to said third photoelectric barrier and having a third time delay, arranged so that when the third barrier is broken, it begins to time;

a fourth timer, coupled to said third photoelectric barrier and having a fourth time delay, arranged so that when the third barrier is cleared, it begins to time, the timers being further arranged such that when either times out, the cutter conveyor stops conveying and the cutting blade is actuated to make a transverse cut of the continuous lamination, the third and fourth delays being selected to correspond to travel of a point of the continuous lamination from the third barrier to the cutting blade position.

3. An apparatus according to claim 2 further comprising a fourth photoelectric barrier for sensing an end point of travel of said cutting blade in a transverse cut for stopping cutting of the continuous lamination and means responsive to said fourth barrier for causing said laminated roll to advance for a next cut by said cutting blade.

4. An apparatus as claimed in claim 2 wherein said third timer receives a starting signal when the third photoelectric barrier is broken, and the fourth timer receives a starting signal when the third barrier is cleared, the third and fourth timers being adjustable to different delay times.

5. An apparatus according to claim 3 further comprising a clutch for switching a conveying drive of the cutting blade on and off, and an electromagnetic brake for rapid stopping said clutch and brake being actuated by output signals of the third and fourth timers by the control device.

6. An apparatus according to claim 4 wherein said third and fourth timers are counters.

7. An apparatus according to claim 1 wherein said cutting blade comprises a scissors-type cutter.

* * * * *